United States Patent
Pan et al.

[11] Patent Number: 6,040,944
[45] Date of Patent: Mar. 21, 2000

[54] PRECISION TUNABLE OPTICAL FILTER

[75] Inventors: Jing-Jong Pan, Milpitas; Jingyu Xu; Yingzhong Shi, both of San Jose, all of Calif.

[73] Assignee: E-Tek Dynamics, Inc., San Jose, Calif.

[21] Appl. No.: 09/013,803

[22] Filed: Jan. 26, 1998

Related U.S. Application Data

[60] Provisional application No. 60/047,938, May 29, 1997.

[51] Int. Cl.[7] .............................. G02B 6/38; G02B 5/28; G02B 26/08
[52] U.S. Cl. .............................. 359/590; 359/210; 385/72
[58] Field of Search .................................. 359/210, 260, 359/578, 499, 500, 497, 498, 579, 589, 590; 385/73, 72, 75, 12, 53, 55, 58, 27

[56] References Cited

U.S. PATENT DOCUMENTS

| | | | |
|---|---|---|---|
| 3,387,531 | 6/1968 | Hesse | 88/14 |
| 4,861,136 | 8/1989 | Stone et al. | 350/96.3 |
| 5,287,214 | 2/1994 | Robertson et al. | 359/260 |
| 5,297,155 | 3/1994 | Pan et al. | 372/20 |
| 5,331,651 | 7/1994 | Becker et al. | 372/32 |
| 5,416,867 | 5/1995 | Thorsten et al. | 385/73 |
| 5,781,341 | 7/1998 | Lee | 359/578 |

OTHER PUBLICATIONS

Pamphlet on "Selectraband™ Linear Variable Filers."
Wyatt, R. et al. "10 kHz Linewidth 1.5 μm InGaAsP External Cavity Laser With 55 nm Tuning Range," *Electronics Letters* 19:3 (Feb. 3, 1983), pp. 110–112.

*Primary Examiner*—Cassandra Spyrou
*Assistant Examiner*—Jared Treas
*Attorney, Agent, or Firm*—Townsend and Townsend and Crew LLP

[57] ABSTRACT

Tuned optical filters, filter systems, and methods for tuning filters make use of a tilted filter rotated about an oblique axis of a collimating lens or other structure. This rotation varies an angle of incidence of an optical signal directed at the filter at an oblique angle to the axis of rotation. Very fine adjustments of optical filters such as for tuning a first narrow band pass filter to match a center wavelength of another narrow band pass filter, can be provided with small angles between the axis of rotation and a normal to the filter surface, and also between the axis of rotation and the optical path for the incident light. Mechanical adjustment to the filtering frequency is facilitated by making use of a rotational motion about the axis of a GRIN collimating lens.

21 Claims, 6 Drawing Sheets

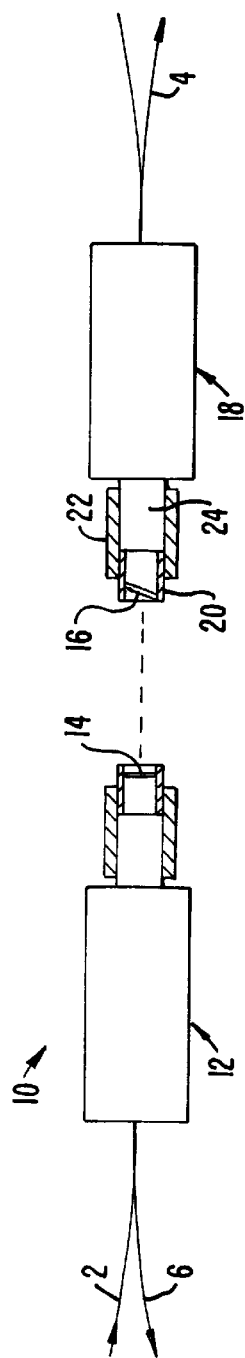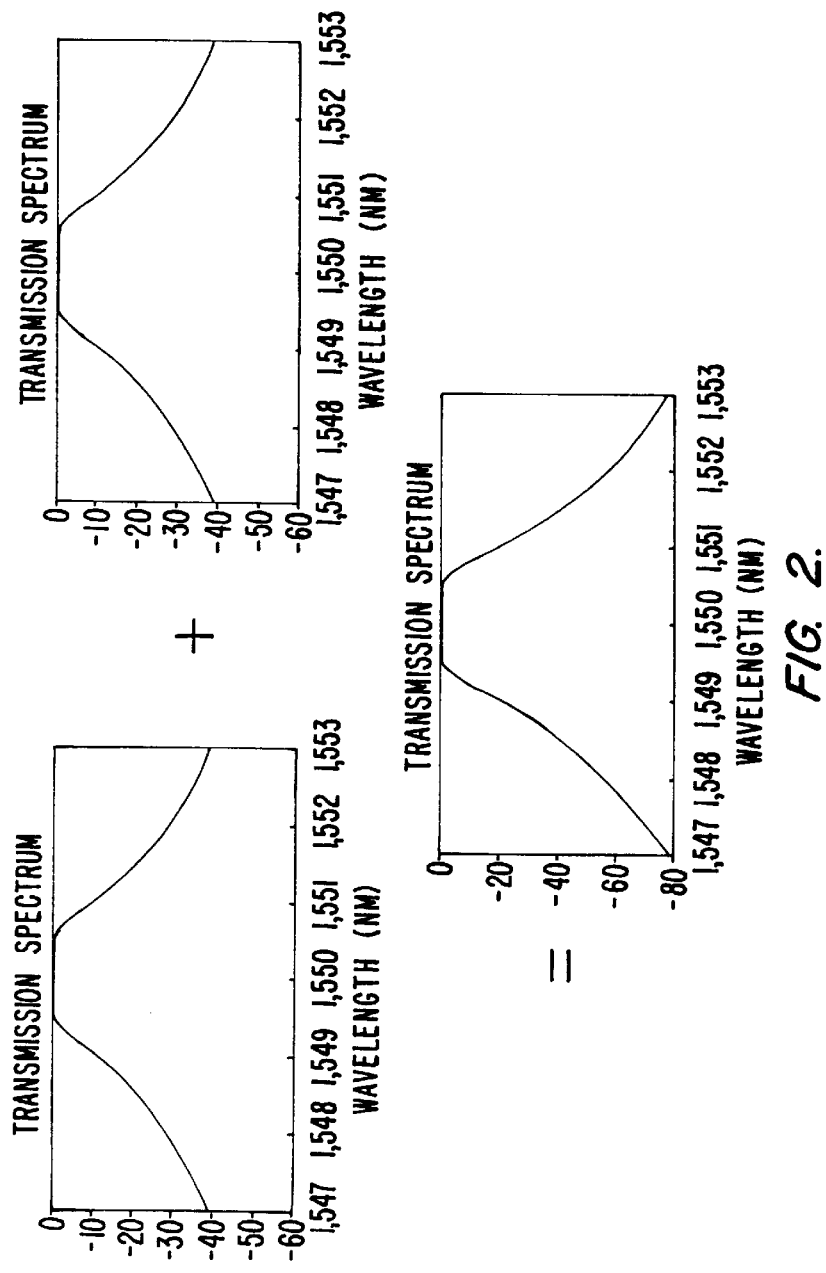

PRECISION TUNABLE OPTICAL FILTER

CROSS-REFERENCE TO RELATED APPLICATION

The present invention is a continuation of, and claims the benefit of priority from, U.S. Provisional Patent Application Ser. No. 60/047,938, filed on May 29, 1997 (Attorney Docket No. 13011-006000), the full disclosure of which is incorporated herein by reference.

BACKGROUND OF THE INVENTION

The present invention is related to the field of fibre optic communications and networks, and more particularly, provides tuned optical filters, filter systems, and methods for filtering and tuning of optical filters which are especially useful in dense wavelength-division multiplex systems.

A variety of optical filters have been developed to differentiate optical signals based on their wavelength. For example, thin film optical filters can selectively pass signals having wavelengths that are less than a nominal maximum wavelength. Such low wavelength pass filters can be combined with similar thin film filter structures which selectively pass optical signals having a wavelength greater than some minimum nominal wavelength. By careful selection of the individual filter structures and the corresponding minimum and maximum nominal wavelengths, multicavity band pass filters having fairly narrow wavelength transmission ranges can be produced.

Unfortunately, a single narrow band pass filter can not always provide the desired filtering performance for dense wavelength division multiplex systems. Specifically, some portion of the optical signal which is outside of the nominal range of a multicavity narrow band pass filter typically "leaks through" with the filtered signal. This leakage can lead to cross talk between signals of differing wavelengths.

Work in connection with the present invention has shown that it can be helpful to isolate the discrete individual wavelengths in a multiplex system using two or more multicavity narrow band pass filters in series. For such multifilter arrangements to substantially enhance filtering performance, the two filters should operate at wave-lengths which are as identical as possible. In particular, the central wavelength value of narrow band pass filters used in series should be substantially the same, or each filter will operate individual at the upper or lower ends of the nominal range, and filter performance will not be improved (beyond that of a single filter structure) to the full extent possible.

Unfortunately manufacturing limitations for narrow band pass filters limit the number of filters having identical central wave-lengths. Hence, the usable filter pairs in each coating run is quite limited. This limited yield greatly increases the cost of matching or "tuned" narrow band pass filters. Work in connection with the present invention has improved matched filter yield somewhat by selectively baking filters in a particular temperature sequence to shift the filter central wavelength using the elastic theory of material. Although such selective baking can shift the filter wavelengths, the accuracy of this method is somewhat limited, so that several bakings are often needed. As baking is time consuming and can degrade the optical characteristics of the filters, some alternative mechanism for varying the central wavelength of narrow band pass filters is desirable.

The present invention solves or substantially mitigates the above problems by providing a mechanism for mechanically tuning optical filters with very high degrees of accuracy and repeatability, and allows the tuning adjustment range and sensitivity to be tailored for a particular filtering application.

SUMMARY OF THE INVENTION

The present invention provides tuned optical filters, filter systems, and method for tuning filters. Generally, a tilted filter is rotated about an axis of a collimating lens to vary an angle of incidence of an optical signal, wherein the signal is directed at the filter at an oblique angle to the axis of rotation. Where very fine adjustments of optical filter wavelengths are desired, such as when tuning a first narrow band pass filter to match a second narrow band pass filter, small oblique angles between the axis of rotation and a normal to the filter surface, and also between the axis of rotation and the incident light can result in a very fine adjustment mechanism. Mechanical adjustment to the filtering wavelength is facilitated by rotational motion about the axis of a GRIN collimating lens.

In a first aspect, the present invention provides a method for tuning an optical filter system. The filter system includes a first filter having a surface, the first filter transmitting or reflecting light which is normal to the surface in a first wavelength range. The method comprises directing light toward the first filter so that the light is incident upon the surface at an angle. The first filter transmits or reflects a portion of the incident light which is within a second wavelength range. The first filter is rotated about an axis which oblique to the incident light, and which is also oblique to the normal to the surface of the first filter. Thus, rotating the first filter changes the incident angle and displaces the second wavelength range.

In another aspect, the present invention provides a method of tuning an optical filter system. The filter system includes first and second filters. The first filter has a surface, and transmits light along a normal to the surface within a first wavelength range. The second filter transmits light in a second wavelength range, and the method comprises collimating and expanding light and directing the collimating light towards the first filter so that the collimated light is incident upon the surface at an angle. The first filter transmits a portion of the incident light which is within a third wavelength range. The first filter is rotated about an axis which is oblique to the incident light, and which is also oblique to the normal to the surface of the first filter so as to displace the third wavelength range. The rotating step is terminated when the third wavelength range is substantial equal to the second wavelength range of the second filter.

In yet another aspect, the present invention provides an optical filter system comprising an input collimating lens. The collimating lens is in an optical path of an optical signal from an input optical fiber to expand and collimate the signal. An output collimating lens is in the optical path from the input collimating lens to focus the optical signal into a first output fiber. A first filter is disposed in the optical path between the first and second collimating lenses. The first filter has a surface, and transmits or reflects light within a first wavelength range when that light is normal to the surface. The surface of the first filter is oblique to the optical path, so that the first filter transmits or reflects the signal light within a second wavelength range. The first filter is rotated about an axis which is oblique to both the optical path, and to the surface of the filter, to displace said second wavelength range.

In yet another aspect, the present invention provides a wavelength dependent multiplexer comprising a first filter assembly having at least one optical fiber. The first assembly also includes a first band pass filter disposed within a path of an optical signal from the at least one optical fiber. The first filter selectively passes a portion of the signal which is within a wavelength range. A second filter assembly has a second band pass filter. The second assembly defines an axis which is at an oblique adjustment angle relative to the signal path. The second band pass filter has a surface with a normal. The normal is at an oblique wobble angle relative to the axis. The second assembly is selectively rotationally positioned about the axis relative to the first assembly so that the second filter selectively passes signals which are substantial within the wavelength range of the first filter.

While the angle between the incident light and the normal to the filter surface (sometimes referred to herein as the adjustment angle) may be quite substantial, it will preferably be less than about 25°, and will ideally be less than about 5°. Similarly, while the angle between the normal to the filter surface and the axis of rotation (sometimes herein referred to as the wobble angle) maybe as much as 25° or more, it will preferably be roughly as large as the adjustment angle, with the sum of the wobble angle and adjustment angle preferably be less than about 10°, and ideally being less than about 5°. This provides a filter wavelength adjustment mechanism which allows very accurate fine tuning of the frequency wavelengths with minimal polarization dependent loss. Such fine tuning of optical filters is particular advantageous for use in dense wavelength division multiplex systems.

BRIEF DESCRIPTION OF THE DRAWINGS

FIG. 1 illustrates a filter system including a pair of narrow band pass filters, one of which is tilted and rotated to match the central wavelength of the other, according to the principals of the present invention.

FIG. 2 graphically illustrates the enhanced filter performance of the tuned serial optical filters of the filter system of FIG. 1.

DETAILED DESCRIPTION OF SPECIFIC EMBODIMENTS

Figure 3A:
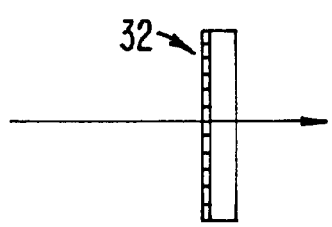
FIGS. 3A–F schematically illustrate the effect and structure of a thin film narrow band pass filter for use in the filter system of FIG. 1.
Figure 3B:
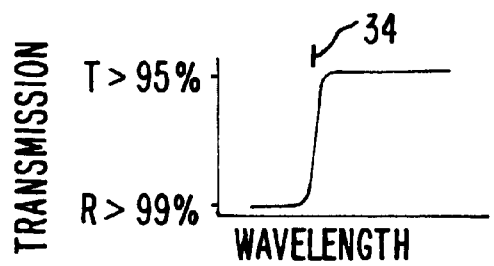
Figure 3C:
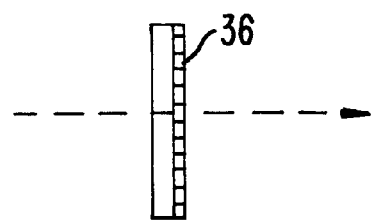
Figure 3D:
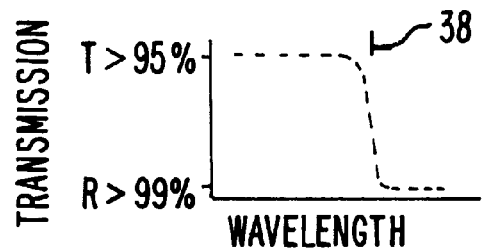
Figure 3E:
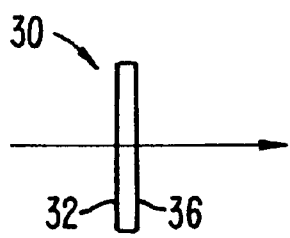
Figure 3F:
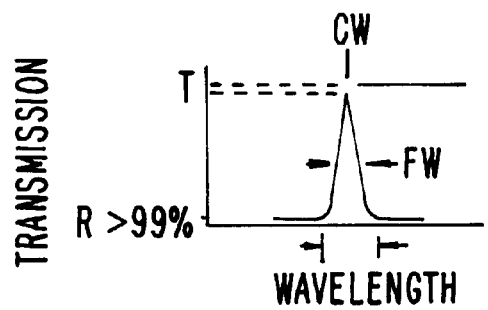

The present invention provides devices, systems, and methods for tuning optical filters. The methods and structures of the present invention are particularly well suited for fine adjustments to narrow band pass filters, long wavelength pass filters, short wavelength pass filters, and the like. The methods and structures of the present invention will find applications in a wide variety of optical systems, including optical data communications, optical telecommunications, optical network testing, and the like. The adjustments provided by the present invention will also find applications for manipulation of light and optical signals in a wide variety of laboratory and commercial applications. The present invention will find its most immediate application for tuning narrow band pass filters to provide serial filter systems with enhanced filter performance for wavelength division multiplex systems.

Optical filter system 10 is illustrated in FIG. 1. An input assembly 12 directions optical signal from a first filter 14 to a second filter 16 of an output assembly 18. Second filter 16 is rotatable about an axis of output assembly 18, and is disposed at an angle relative to the signal from input assembly 12. More specifically, filter 16 is support by a ring 20 which is affixed to a sleeve 22. Sleeve 22 is rotatably disposed around a GRIN lens 24, so that second filter 16 is easily rotated about an axis of the GRIN lens. GRIN lens 24 is supported at an oblique angle relative to the optical signal from input assembly 12 (see FIG. 6). As second filter 16 is disposed at an oblique angle relative to the axis of GRIN lens 24, the optical signal from input assembly 12 is incident upon second filter 16 at an angle which varies with the rotational position of sleeve 22 about GRIN lens 24.

By carefully selecting the rotational position of second filter 16, the filtering frequencies of second filter 16 can be tuned to substantially equal those of first filter 14, thereby providing a filter system having enhanced filtering performance. The optical signal passing through such tuned filters will have a sharper transmission spectrum and a steeper skirt (the slope of the transmission spectrum outside the nominal transmission range) to minimize channel cross talk. The adjusted (or tuned) serial filters can have center wavelengths which are substantially exactly matched, with little increase in insertion loss over a single narrow bandpass filter and very even transmission performance within the nominal pass bandwidth, as can be understood with reference to FIG. 2.

Referring now to FIGS. 3A–F, each of the filters of filtering system 10 will generally comprise a narrow band pass filter 30. These thin film structures generally include a long pass filter 32 which transmits optical signals having a wavelength greater than a nominal value 34, in combination with a short pass filter 36 which substantially transmits optical signals having wavelengths that are less than a nominal maximum wavelength 38. The resulting multicavity narrow band pass filter 30 (which may have the coatings forming short band pass filter 32 and long band pass filter 36 disposed on the same side) will generally have a peak transmission T of over 80% of the input signal, with a mean filter width FW of less than about 40 nm. The slope of the transmission curve will preferably be less than about 3% along the edge of the band pass range. The center wavelength CW will preferably be about 1.3 or 1.55 μm when a single bandpass filter is disposed (preferably at a 1° angle to avoid return of reflected light) between input and output collimators, each filter preferably providing an insertion loss of less than 1.6 dB, giving wavelength isolation of −40 dB between 0.85 and 1.3 μm, and between 1.3 and 1.55 μm, all with a return loss of over 40 dB. Those with skill in the art will recognize that a wide variety of alternative filter structures will be compatible with the tuning mechanism of the present invention.

Figure 4A:
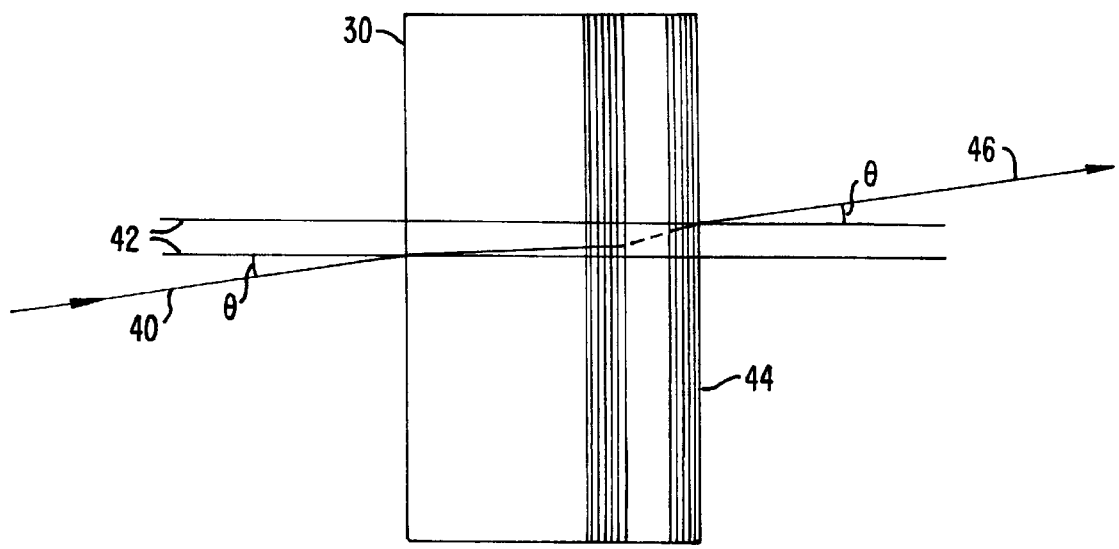
FIGS. 4A and B illustrate the effects of varying incident angle on the center wavelength of a narrow band pass filter.

Referring now to FIG. 4A, incident light 40 is directed at multicavity filter 30 at an angle θ. More specifically, incident light 40 is incident upon filter 30 so as to define an angle θ between an optical path of the incident light and a normal 42 to a surface 44 of filter 30. Please note that it may be preferable to have the film coatings oriented towards the incident light, rather than away from the incident light as shown in FIG. 4A.

For a single cavity filter, we can derive the central wavelength shift due to variations of incident angle θ from the following equations, which describe the transmission of light from the filter:

$$T=T_0/(1+F \sin^2\phi)$$

and $$\phi=2\pi n d \cos \gamma/\lambda$$

$T_0$ is the maximum transmission, F is a positive number, N and D are the index of refraction and physical thickness of the cavity spacer, respectively. $\gamma$ is the refraction angle within the spacer, while $\lambda$ is the wavelength of light. The central wavelength of the filter is that wavelength at which $\phi=m\pi$, in which m is an integer. From these relationships, we can derive that:

$$\lambda = \frac{2nd\cos\gamma}{m}$$

If we specify that the central wavelength at which the incident angle θ=0 is $\lambda_0$, then we get:

$$\lambda=\lambda_0 \cos \gamma$$

We know that angle $\lambda$ is related to the incident angle θ by Snell's Law as follows:

$$\theta=n \sin \gamma$$

Therefore, we can derive that:

$$\lambda = \lambda_0 \sqrt{1 - n_0^2\sin^2\theta/n^2}$$

While it would be difficult to derive a similar analytical expression for multicavity filters due to their complexity, we can extend the above analysis to find the form of the equation governing such multicavity structures. Thus, we have that:

$$\lambda(\theta) = \lambda_0 \sqrt{1 - A\sin^2\theta}$$

in which parameter A will be determined by the individual filter structure. Note that is a good approximation when θ approaches 0. Work in connection with the present invention has shown that the actual value of A for practical filters comprising $Ta_2O_5$ and $SiO_2$ is around 0.4.

Figure 4B:
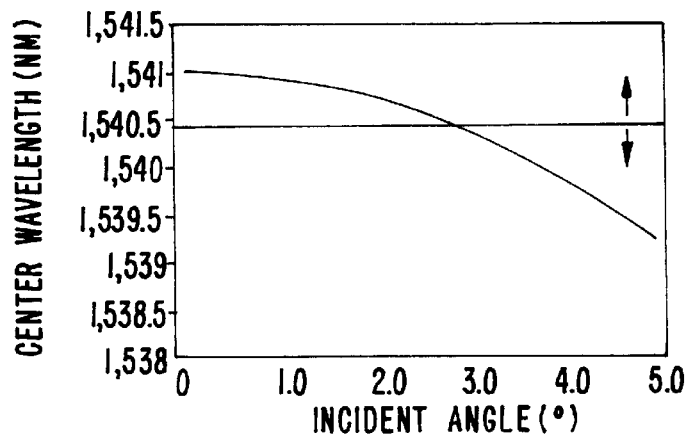

From the above equations, we can see that when incident angle θ increases, the effective central wavelength of the filter decreases. This relationship is graphically illustrated in FIG. 4B. It should be noted that the central wavelength when the incident light is normal to the filter surface is generally the longest effective central wavelength which will be provided for a specific filter structure. In other words, we will generally be decreasing the effective central wavelength of the filter when we vary the incident angle θ away from 0°. For this reason, we will usually adjust the filter having the longer normal central wavelength to match the filter having the shorter normal central wavelength. It should be noted that this is not always required, as neither of the two filters need necessarily be normal to the incident light.

Figure 5:
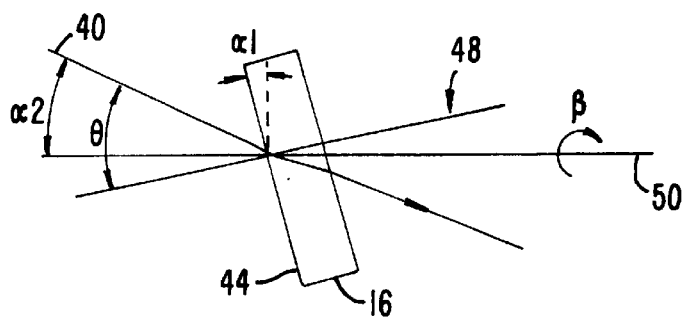
FIG. 5 schematically illustrates the adjustment angle and wobble angle of the tunable filter of the filter system of FIG. 1.
Figure 6:
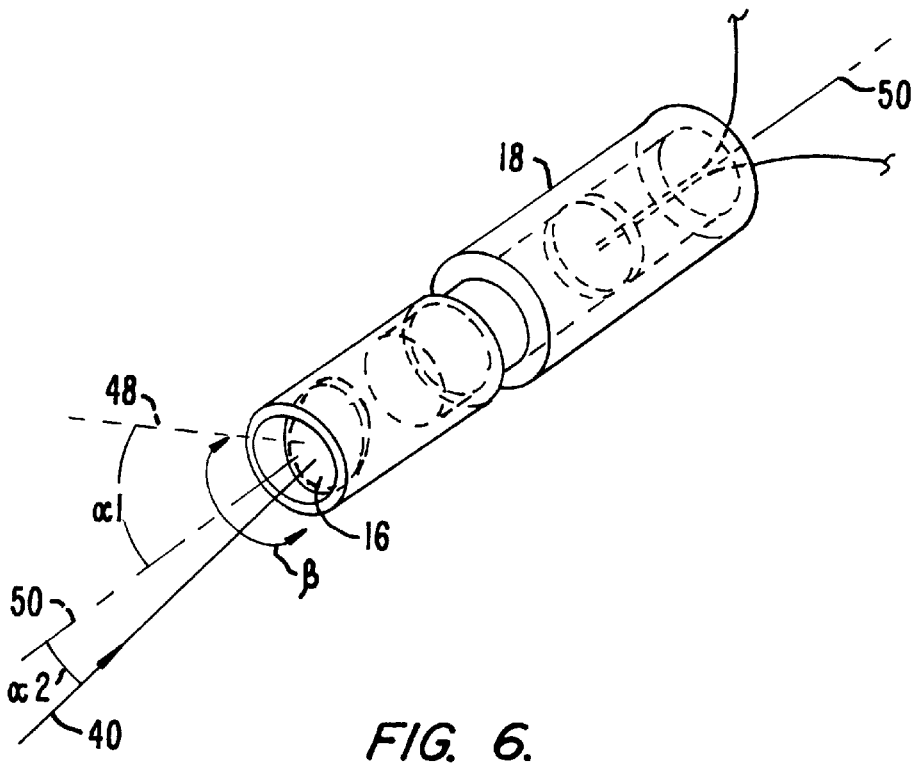
FIG. 6 is a perspective view of the tuneable filter of FIG. 1, showing rotation of the tilted filter about an axis of rotation which is at an angle to the incident light.

FIGS. 5 and 6 illustrate a particularly advantageous mechanism to precisely vary the incident angle θ between incident light 40 and a surface 44 of second filter 16. To accurately control incident angle θ, particularly when θ is quite small, second filter 16 is mounted so that a normal 48 from surface 44 of filter 16 defines a wobble angle α1 relative to an axis 50 of output assembly 18. As described above, the second filter is rotatable about the axis of the output assembly, so that the normal 48 of filter 16 will precess along a cone centered about the axis of rotation. Additionally, incident light 40 is directed toward filter 16 at an adjustment angle α2 relative to the axis 50. While filter 16 maintains a consistent angle relative to the axis throughout the rotation of the filter, the angle between incident light 40 and the surface of filter 16 will vary depending on the rotational position of the filter.

As described above, work in connection with the present invention has shown that optical filters fabricated in the same coating runs will often have slightly different wavelength characteristics. For example, when two narrow bandpass filters are arranged in series with the filter surfaces aligned parallel to each other, there will often be a slight difference between the central wavelength of the filters, even though the filters are fabricated simultaneously. As a result, where the nominal transmission ranges have roughly the same width, one filter will primarily prevent transmission of optical signals having wavelengths greater than the nominal range, while the other filter may substantially independently have to prevent transmission of optical signals which are shorter than the nominal wavelength range. As a result, total filter performance is not enhanced (by the serial arrangement) to the full extent possible.

To overcome this limitation, the first and second filters of filter system 10 are aligned in series, and an incident angle of at least one of the two filters is independently varied. The filters should generally be separated in space so that there is no light interference between them. The total transmission T of the filter system can then be expressed as $$T(\lambda)=T_1(\lambda) \cdot T_2(\lambda)$$

in which $T_1$ and $T_2$ are the transmission of the first and second filters, respectively. Translating this relationship into a decibel expression, we have that 10 log T(λ)(dB)=10 log $T_1$(λ)(dB)+10 log $T_2$(λ)(dB)

If the two filters are exactly identical, or if the filters are tuned by accurately angling at least one of the filters relative to the incident light, the total transmission will be:

10 log T(λ)(dB)+20 log T1(λ)(dB)

In other words, the isolation between channels within a wavelength division multiplex system using the tuned serial filters of filter system 10 is twice that of a single multicavity filter structure. This relationship is graphically expressed in FIG. 2.

While the two filters will act together on light transmitted entirely through filter system 10, it should be understood that light signals from input fiber 2 which are outside the nominal filter transmission frequency will be reflected by first filter 14 alone, often eventually being focused into a second output fiber 6 (as will be described in more detail hereinbelow). Hence, the reflection from filter system 10 will be governed by the equations for reflection from the single fixed filter:

$R(\lambda) = R_1(\lambda)$ or $10 \log R(\lambda)(dB) = 10 \log R_1(\lambda)(dB)$ The above equations apply generally to variations in incident angle, and help to explain the shift in effective filter frequencies which occurs when the filter is angled relative to the incident light. To understand the effect of rotating the tilted second filter 16 about the cylindrical structures of output assembly 18, it is helpful to analyze the effects of the wobble angle α1 and the adjustment angle α2 on the variation in effective filter frequency. From the above equations, we can see that the effective filter frequency will vary with the incident angle θ between the incident light path and the normal 48 of second filter 16. Referring once again to FIGS. 5 and 6, incident angle θ will depend on wobble angle α1, adjustment angle α2, and the rotational position β of second filter 16 about the axis of rotation 50. Wobble angle α1 and adjustment angle α2 will typically be defined during the design and production of output assembly 18, while rotational position β will be adjusted to tune second filter 16 to the first filter during final assembly of each filter system.

Figure 7:
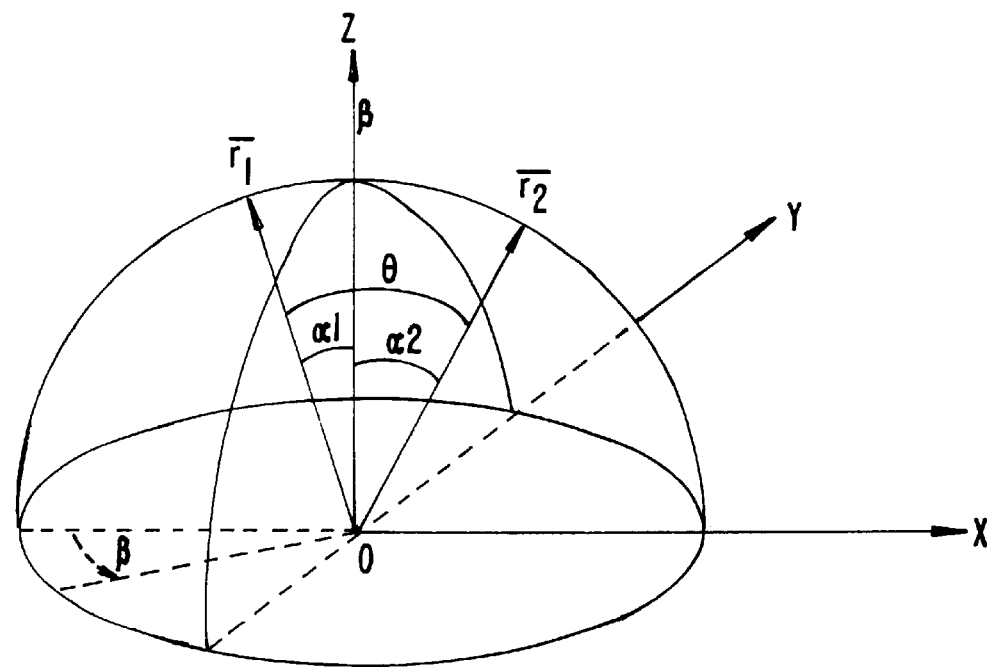
FIG. 7 graphically illustrates the effects of rotating the tilted filter on the angle of incidence within the filter system of FIG. 1.

To illustrate the effects of wobble angle α1, adjustment angle α2, and rotational position β on incident angle θ, we can use the direction vectors of the incident light and filter normal in a spherical coordinate system, as illustrated in FIG. 7. Generally, incident angle θ is the angle between the directional vector of the incident light and the directional vector of the normal to the second filter. By establishing an expressions for each of these two vectors, we can derive the incident angle from their dot products. In other words, if vector $\vec{r}_1$ represents wobble angle α1, and vector $\vec{r}_2$ represents the adjustment angle α2, then we know that:

$$\theta = \left| \arccos \frac{\vec{r}_1 \cdot \vec{r}_2}{|\vec{r}_1||\vec{r}_2|} \right|.$$

For convenience, we can assume that both vectors are unit vectors $$|\vec{r}_1| = |\vec{r}_2| = 1.$$

We can also assume that the axis of rotation 50 is aligned with the Z axis, and set our starting positions for the vectors in spherical coordinates as $$\vec{r}_1 = (1, \alpha 1, \pi) \text{ and } \vec{r}_2 = (1, \alpha 2, 0).$$

As can be understood with reference to FIG. 6, the first vector (representing wobble angle α1) will rotate about the axis of rotation as we change the angular position β of second filter 16, while our second vector (representing adjustment angle α2) will remain fixed. Therefore, the general expression for our first vector is $$\vec{r}_1 = (1, \alpha 1, \pi + \beta).$$

while the second vector remains unchanged. Translating these vectors into a rectangular coordinate system, we have:

$$\vec{r}_1 = (\sin \alpha 1 \cos(\pi + \beta), \sin \alpha 1 \sin(\pi + \beta), \cos \alpha 1) \text{ and}$$

$$\vec{r}_2 = (\sin \alpha 2, 0, \cos \alpha 1)$$

Using these expressions, together with our dot product expression for θ, and substituting, we find that:

$$\vec{r}_1 \cdot \vec{r}_2 = \cos \alpha 1 \cos \alpha 2 - \sin \alpha 1 \sin \alpha 2 \cos \beta$$

Therefore, we have:

$$\theta = |\arccos(\cos \alpha 1 \cos \alpha 2 - \sin \alpha 1 \sin \alpha 2 \cos \beta)|$$

The above equation allows us to determine the incident angle θ from the wobble angle α1, adjustment angle α2 and angular position β of the tilted second filter 16. By combining this information with the previously described effects of incident angle θ on effective filter wavelengths, we can accurately determine the adjustability provided by a particular filter system, and can also design filter systems having wobble and adjustment angles that provide sufficient variability for a particular application.

As can be understood from the above analysis, the present rotary filter adjustment mechanism will allow precise tuning of optical filters within a fairly narrow adjustment range, or alternatively allow adjustments throughout a much wider range. Advantageously, the structure and operating mechanism remains the same for both precise and wide ranging filter adjustment systems, thereby minimizing the cost of production for specialized tuned filter systems. While there is no theoretical limit on the range of adjustment, losses will tend to increase at higher incident angles θ, so that it is generally preferable to limit the wobble and adjustment angle to less than about 25°, so that the maximum incident angle (defined by the sum of the wobble and adjustment angles) will be less than about 50°.

The present invention is particularly well-suited for precise adjustment of optical filters using small wobble and adjustment angles of less than about 5° each. In fact, to minimize polarization dependent losses, still smaller angles are often preferable. For example, to maintain polarization dependent losses at or below about 0.05 dB, the maximum incident angle θ will ideally be about 5° or less. It should be noted that there is no limitation on the relative sizes of the wobble and adjustment angles. In other words, wobble angle α1 can be larger or smaller than adjustment angle α2.

Figure 8:
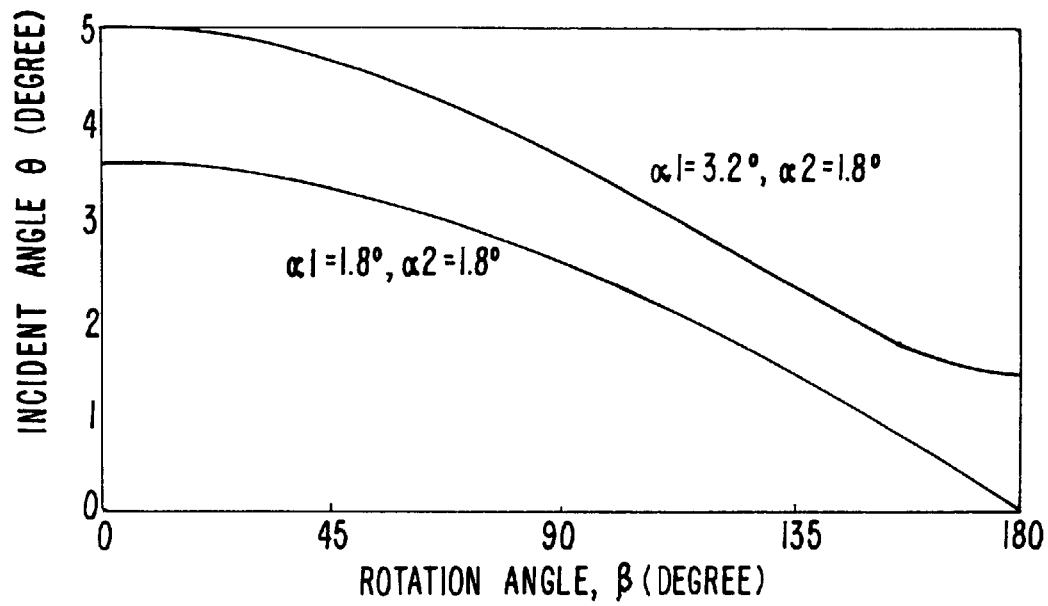
FIGS. 8 and 9 graphically illustrate the change in incident angle from rotation of the tilted filter, and also illustrate the change in effective central wavelength of the tilted filter, respectively.
Figure 9:
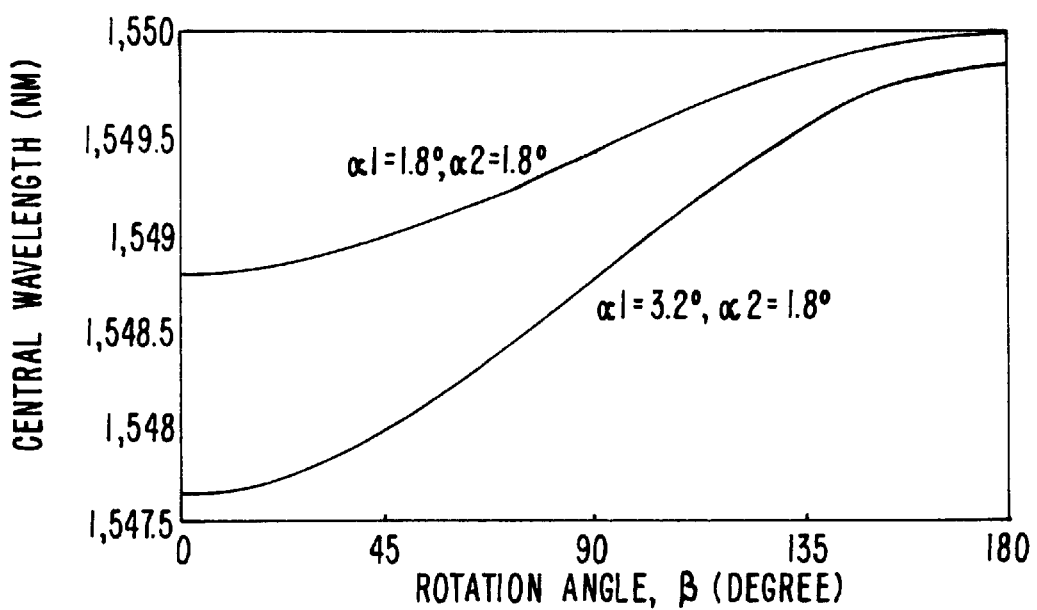

Incident angle variation and wavelength tuning ranges for wobble and adjustment angles appropriate to tune narrow band pass filters for use in the filter system of FIG. 1 are illustrated in FIGS. 8 and 9.

Conveniently, these small adjustment angles may be provided between coaxially aligned input and output assemblies by using a GRIN lens having an angled transmission surface adjacent first filter 14 (see FIG. 1). Light will be transmitted from such an angled lens surface at a slight angle relative to the axis of both the input and output assemblies, so that the slant of the GRIN lens transmission face defines adjustment angle α2. Choosing a GRIN lens having an angled surface that provides an adjustment angle α2 of 1.8°, we can also set the wobble angle α1 of the second filter at 1.8°. This allows incident angle θ to vary from 0° to 3.6°, as illustrated in FIG. 8. By instead setting wobble angle a1 at 3.2°, and using the same GRIN lens to provide an adjustment angle of 1.8°, our rotary adjustment mechanism allows an incident variations of between about 1.4° and 5°, as is also shown in FIG. 8.

Assuming our filter co-efficient A is equal to 0.4 (as explained above) and assuming that our adjustable filter has a central wavelength of 1,550.0 nm, the above wobble and adjustment angles give the wavelength tuning ranges illustrated in FIG. 9.

In general, we can summarize the relationship between wobbling α1, adjustment angle α2, and the total variation in incident angle θ between a minimum incident angle $\theta_{min}$ and a maximum incident angle $\theta_{max}$ as:

$$\theta_{min} = |\alpha_1 - \alpha_2|\beta = 180°$$

$$\theta_{max} = \alpha_1 + \alpha_2 \beta = 0°$$

If we know the incident angle of the filter is $\theta_f$ (this value is generally available from the coating specifications), our rotary adjustment mechanism will generally provide a tuning range equal to the following quantity:

$$-\left(\lambda_0\sqrt{1 - A\sin^2\theta_f} - \lambda_0\sqrt{1 - A\sin^2\theta_{max}}\right) + \left(\lambda_0\sqrt{1 - A\sin^2\theta_{min}} - \lambda_0\sqrt{1 - A\sin^2\theta_f}\right)$$

Figure 12:
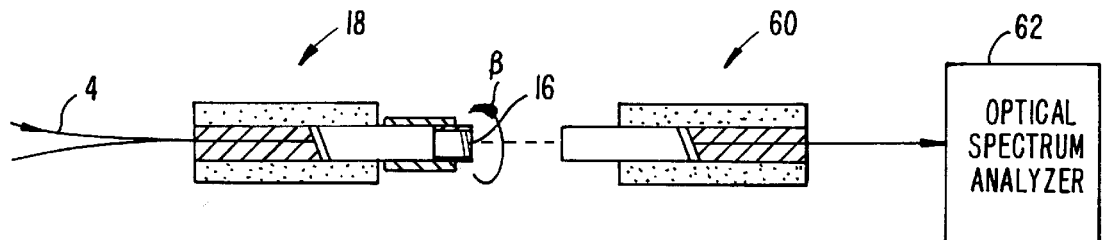
FIGS. 12 and 13 illustrate a method for tuning an optical filter, and show structural details of the filter system of FIG. 1, according to the principals of the present invention.
Figure 13:
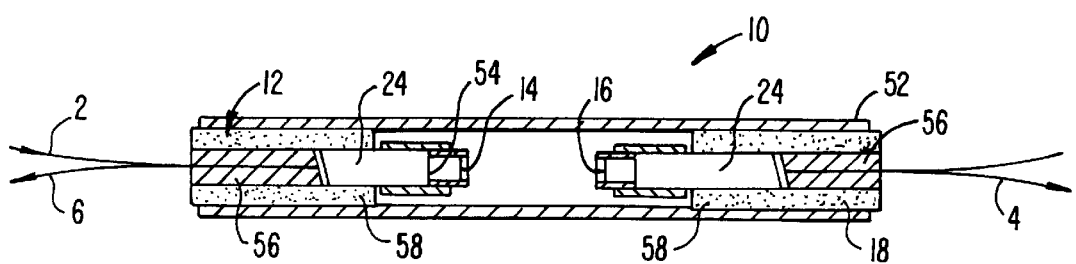

The internal components of filter system 10 can be understood with reference to FIGS. 10–13. As illustrated in FIG. 13, input assembly 12 is held in alignment with output assembly 18 by an outer casing 52. As described above, the adjustment angle α2 may conveniently be provided by using a GRIN lens 24 having a surface 54 which is at a slightly slanted surface 54, typically being at an angle of about 1.8° from a normal of the axis to the GRIN lens. Optical signals from input fiber 2 are collimated and radially expanded by GRIN lens 24 of input assembly 12, while a similar GRIN lens of output assembly 18 focuses the optical signal for entry into first input fiber 4.

Quarter pitch (or near quarter pitch) GRIN lenses arranged at the ends of input and output optical fibers have been found to be very effective as collimators. It has been found that using a GRIN lens having a length of approximately 0.23 times the pitch is more effective than a GRIN lens of a length of 0.25 times the pitch. While a variety of alternative collimating lenses may be used within the scope of the present invention, including aspheric lenses, GRIN lenses are generally preferred.

The optical fibers are held in cylindrical glass ferrules 56. The ends of the ferrules and the ends of the fibers adjacent the GRIN lenses are slant polished together, so that the tip of the fiber does not end with a surface perpendicular to the longitudinal axis of the fiber. Typically, these ends form an angle of between about 8° and 12°. These end surfaces are then covered with anti-reflective coatings. The face of GRIN lenses 24 adjacent ferrules 56 are reciprocally slant polished at substantially the same angle as the ferrule and fiber. This slant polished face is also coated with anti-reflection material to reduce insertion loss, and to minimize reflections between these surfaces.

The ferrules 56 are separated from GRIN lenses 24 by a gap to avoid Fabry-Perot interference, the gap typically being at least about 0.05 mm. The end of GRIN lens 24 opposite the associated optical fibers will also have a coating of anti-reflection material. Ferrules 56 and GRIN lenses 24 are held in alignment using sleeves 58.

As is explained in more detail in co-pending U.S. patent application Ser. No. 08/470,815, filed Jun. 6, 1995, (Attorney Docket No. 13011-002310, the full disclosure of which is incorporated herein by reference), input assembly 12 makes use of a single GRIN lens to collimate and expand the optical signal from input fiber 2, and also to focus the portion of the optical signal which is reflected by first filter 14 into second output fiber 6. As shown in cross-section in FIG. 11, the end sections of input fiber 2 and second output fiber 6 are snugly held together in a single ferrule 56. The end sections of the input and second output optical fibers are unjacketed, so that the core and cladding of each fiber are exposed.

Figure 10:
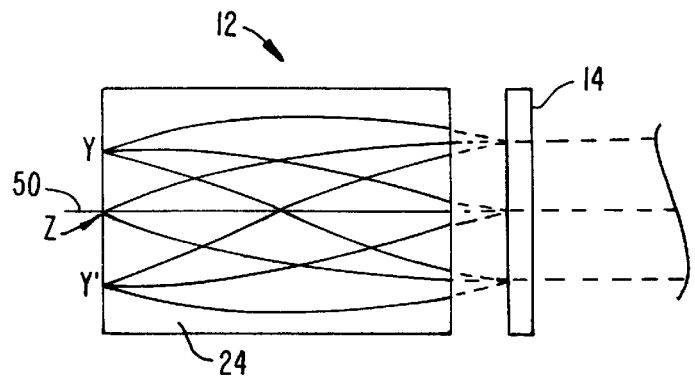
FIG. 10 schematically illustrates the use of a single GRIN lens to collimate light from a first optical fiber, and to focus reflected light on a second optical filter, for use in the filter system of FIG. 1.
Figure 11:
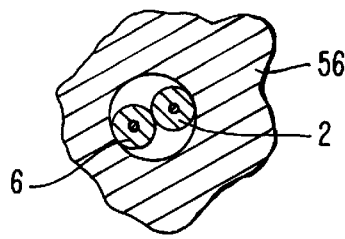
FIG. 11 is a cross sectional view showing the input and output optical fibers held within a single collimator adjacent to one of the GRIN lenses of the filter system of FIG. 1.

With reference to FIG. 10, light which is reflected by first filter 14 passes through quarter GRIN lens 24 two times, so that the single GRIN lens acts as a half-pitch GRIN lens. Thus, light from a point source Z which is on axis 50 is reflected by a normal first filter 14 will be focused by GRIN lens 24 back at point Z. A point source of light Y which is slightly off the longitudinal axis of the GRIN lens will be focused at a point Y', the Y' being equally removed from, but on the other side of, axis 50.

While the input fiber 2 and second output fiber 4 fits snugly into ferrule 56, the cladding of the fibers maintains a distance between their respective cores. By aligning the ends of the optical fibers so that each is slightly removed from the longitudinal axis, light from input fiber 2 which is reflected by first filter 14 will be focused by GRIN lenses 24 and received by the core of the second output fiber 6. It should be noted the positions of the fiber ends with respect to the longitudinal axis, as called for by the theoretical operation of the GRIN lens, is an idealization. Empirical, it has been found that fine adjustments are often required to achieve maximum coupling performance.

A method for tuning optical fibers for use within filter system 10 can also be understood with reference to FIGS. 12 and 13. To facilitate both tuning and alignment of filter system 10, these steps are performed separately. Initially, an unfiltered collimator 60 is used in place of input assembly 12. Using the reversible light path theorem, the central wavelength of second filter 16 is pretuned by directing a tuning optical signal from output fiber 4 through GRIN lens 24 and towards the output collimator through second filter 16. Second filter 16 is rotated about the GRIN lens to an angular position β at which the central filter wavelength matches that of first filter 14. The optical signal from the output fiber, as filtered by second filter 16, is monitored using an optical spectrum analyzer 62 to help direct rotation of the second filter.

Once the rotational position of filter 16 has been adjusted to provide the desired effective central wavelength, collimator 60 is removed and replaced with input assembly 12. By maintaining the rotational orientation of second filter 16, the central wavelength of the filter remains at its target value, so that input assembly 12 need only be aligned with output assembly 18 to minimize transmission insertion loss of the filter system. Once the transmission insertion loss is properly minimized, the reversible light path theorem assures us that optical signals transmitted from the input assembly to the output assembly will be filtered by second filter 16 about the target central wavelength as established in the pretuning phase.

While the exemplary embodiment of the invention has been described in some detail, by way of illustration and for clarity of understanding, a variety of modifications, alternatives, and changes will be obvious to those skilled in the art. Therefore, the scope of present invention is limited solely by the appended claims.

What is claimed is:

1. A method for tuning an optical filter system, the filter system including a first filter and a second filter, the first filter having a surface and transmitting or reflecting light along a normal to the surface in a first wavelength range, the second filter reflecting or transmitting light in a target wavelength range, the method comprising;

directing light toward the first filter so that the light is incident upon the surface at an angle, and so that the first filter transmits or reflects a portion of the incident light which is within a second wavelength range;

displacing the second wavelength range independently of the target wavelength range by rotating the first filter relative to the second filter and about an axis which is oblique to the incident light, and which is also oblique to the normal to the surface of the first filter to change the incident angle, wherein the first filter is rotated with a collimator assembly, wherein a GRIN lens of the collimating assembly is substantially coaxial with the axis of rotation, and monitoring the second wavelength range from the first filter and terminating the rotating step when the second wavelength range is aligned with the target wavelength range.

2. A method for tuning an optical filter system, the filter system including a first filter and a second filter, the first filter having a surface and transmitting or reflecting light along a normal to the surface in a first wavelength range, the second filter reflecting or transmitting light in a target wavelength range, the method comprising:

directing light toward the first filter so that the light is incident upon the surface at an angle, and so that the first filter transmits or reflects a portion of the incident light which is within a second wavelength range;

displacing the second wavelength range relative to the target wavelength range by rotating the first filter independently of the second filter and about an axis which is oblique to the incident light, and which is also oblique to the normal to the surface of the first filter to change the incident angle;

monitoring the second wavelength range from the first filter and terminating the rotating step when the second wavelength range reaches the target wavelength range; and filtering light with both the first filter and the second filter in series, the second filter aligned with the first filter after at least a portion of the monitoring step to avoid filtering the monitored light with the second filter.

3. A method for tuning an optical filter system, the filter system including dirt and second filters, the first filter having a surface and transmitting light along a normal to the surface within a first wavelength range, the second filter transmitting light in a second wavelength range, the method comprising:

collimating and expanding light and directing the collimated light toward the first filter so that the collimated light is incident upon the surface at an angle so that the first filter transmits a portion of the angled incident light which is within a third wavelength range;

displacing the third wavelength range relative to the second wavelength range by rotating the first filter independently of the second filter about an axis which is oblique to the angled incident light, and which is also oblique to the normal to the surface of the first filter;

terminating the rotating step when the third wavelength range is substantially equal to the second wavelength range of the second filter and affixing the rotated first filter rotationally relative to the second filter; and directing light through the affixed first and second filters in series so that a transmission spectrum slope of the filter system is significantly steeper than a transmission spectrum slope of the first filter and than a transmission spectrum slope of the second filter.

4. A method as claimed in claim 3, further comprising focussing the serially filtered light into a first output optical fiber.

5. A method for turning an optical filter system, the filter system including first and second filters, the first filter having a surface and transmitting light along a normal to the surface within a first wavelength range, the second filter transmitting light in a second wavelength range, the method comprising:

collimating and expanding light and directing the collimated light toward the first filter so that the collimated light is incident upon the surface at an angle so that the first filter transmits a portion of the angled incident light which is within a third wavelength range;

displacing the third wavelength range relative to the second wavelength range without altering the second wavelength range by rotating the first filter independently of the second filter and about an axis which is oblique to the angled incident light, and which is also oblique to the normal to the surface of the first filter;

terminating the rotating step when the third wavelength range is substantially equal to the second wavelength range of the second filter;

directing light through the first filter and through the second filter in series and focussing the serially filtered light into a first output optical fiber; and reflecting light from the second filter which is outside the second wavelength range and focussing the reflected light into a second output optical fiber.

6. A method as claimed in claim 5, wherein a GRIN lens expands and collimates light from an input fiber, and wherein the GRIN lens also focuses the reflected light into the second output fiber.

7. A method for tuning an optical filter system, the filter system including first and second filters, the first filter having a surface and transmitting light along a normal to the surface within a first wavelength range, the second filter transmitting light in a second wavelength range, the method comprising:

collimating and expanding light and directing the collimated light toward the first filter so that the collimated light is incident upon the surface at an angle so that the first filter transmits a portion of the angled incident light which is within a third wavelength range;

displacing the third wavelength range relative to the second wavelength range by rotating the first filter independently of the second filter about an axis which is oblique to the angled incident light, and which is also oblique to the normal to the surface of the first filter;

terminating the rotating step when the third wavelength range is substantially equal to the second wavelength range of the second filter; and focussing light transmitted by the first filter with a test collimator assembly during the rotating step to monitor the third wavelength range, removing the test collimator assembly, and replacing the test collimator assembly with a second filter assembly including the second filter and an input optical fiber.

8. A method as claimed in claim 3, wherein the axis of rotation defines an angle of less than about 25 degrees with the normal to the surface of the first filter, and wherein the axis of rotation also defines an angle of less than 25 degrees with the angled incident light.

9. An optical filter system comprising:

an input collimating lens in an optical path of an optical signal from an input optical fiber to expand and collimate the signal;

an output collimating lens in the optical path from the input collimating lens to focus the optical signal into a first output optical fiber;

a first filter disposed in the optical path between the first and second collimating lenses, the first filter having a surface, the first filter transmitting or reflecting light within a first wavelength range when the light is not to the surface, the surface of the first filter oblique to the optical path so that the first filter transmits or reflects the signal within a second wavelength range; and a second filter disposed in the optical path between the first and second collimating lenses, the second filter transmitting or reflecting the signal within a third wavelength range, the first filter rotated relative to the second filter about an axis of at least one of the first and second collimating lenses which is oblique to both the optical path and the surface to displace said second wavelength range so that the second wavelength range and the third wavelength range are substantially equal.

10. A filter system as claimed in claim 9, wherein the first filter is supported by a cylindrical structure which is coaxial with the axis to facilitate rotating the filter about the axis.

11. A filter system as claimed in claim 9, wherein the first filter is supported by a cylindrical structure which is coaxial with the axis to facilitate rotating the filter about the axis, and wherein the cylindrical structure comprises a collimator assembly which includes the output GRIN lens.

12. A filter system as claimed in claim 11, wherein the rotational position of the collimator assembly is fixed.

13. A filter system as claimed in claim 9, wherein the input and output collimating lenses comprise input and output GRIN lenses, respectively, wherein the first filter is rotated about the axis of the output GRIN lens.

14. A filter system as claimed in claim 13, wherein the input and output GRIN lenses are co-axially aligned, and wherein an end of the input GRIN lens adjacent to the output GRIN lens is slanted so that the optical path from the input GRIN lens defines an oblique angle relative to the axis of rotation.

15. A filter system as claimed in claim 13, further comprising a second output optical fiber adjacent to the input optical fiber, wherein the input GRIN lens focuses a portion of the signal which is outside the second wavelength range into the second output fiber.

16. A filter system as claimed in claim 9, wherein the axis defines an oblique angle of less than about 25 degrees with the optical path, and wherein the axis defines an oblique angle of less than 25 degrees with the normal to the surface of the first filter.

17. A wavelength dependent multiplexer comprising:

a first filter assembly having an input optical fiber and a first bandpass filter disposed within a path of an optical signal from the input optical fiber, the first filter selectively passing a portion of the signal within a wavelength range, the first filter selectively reflecting another portion of the signal outside the wavelength range into an output optical fiber;

a second filter assembly having a second bandpass filter, the second filter assembly defining an axis which is at an oblique adjustment angle relative to the signal path, the second bandpass filter having a surface with a normal which is at an oblique wobble angle relative to the axis, the second filter assembly, including the second filter, selectively rotationally positioned about the axis relative to the first filter assembly so that the second filter selectively passes signals which are substantially within the wavelength range of the first filter.

18. A wavelength dependent multiplexer as claimed in claim 17, wherein the adjustment angle is less than 25 degrees.

19. A wavelength dependent multiplexer as claimed in claim 18, wherein a sum angle of the wobble angle and the adjustment angle is less than 50 degrees.

20. A wavelength dependent multiplexer as claimed in claim 17, wherein the adjustment angle is less than 5 degrees.

21. A wavelength dependent multiplexer as claimed in claim 18, wherein a sum angle of the wobble angle and the adjustment angle is less than 10 degrees.

* * * * *